(12) United States Patent
Kar et al.

(10) Patent No.: US 7,743,118 B1
(45) Date of Patent: *Jun. 22, 2010

(54) PROGRAMMABLE COMMUNICATION INTERFACE

(75) Inventors: Barun Kar, Sunnyvale, CA (US); Troy M. Sheets, San Francisco, CA (US); Truman Joe, Stanford, CA (US); Bharani Chadalavada, Santa Clara, CA (US); Geetha Ramaian, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/331,746

(22) Filed: Dec. 10, 2008

Related U.S. Application Data (63) Continuation of application No. 10/431,750, filed on May 8, 2003, now Pat. No. 7,509,399.

(51) Int. Cl.
*G06F 15/177* (2006.01)

(52) U.S. Cl. .................. 709/220; 709/221; 709/222; 709/246; 710/5; 710/10; 710/19; 710/104; 725/37; 712/29; 712/220

(58) Field of Classification Search ......... 709/220–222, 709/246, 244, 250; 710/5, 10, 19, 104; 725/37; 712/29, 220
See application file for complete search history.

(56) References Cited

U.S. PATENT DOCUMENTS

| | | | |
|---|---|---|---|
| 4,574,354 A | 3/1986 | Mihalik et al. | |
| 5,019,910 A | 5/1991 | Filmer | |
| 5,051,980 A | 9/1991 | Olsen | |
| 5,373,501 A | 12/1994 | Roland | |
| 5,379,337 A | 1/1995 | Castillo et al. | |
| 5,812,826 A | 9/1998 | McLain, Jr. | |
| 5,841,992 A | 11/1998 | Martin | |
| 5,958,024 A | 9/1999 | Typaldos et al. | |
| 5,968,196 A | 10/1999 | Ramamurthy et al. | |
| 6,014,760 A | 1/2000 | Silva et al. | |
| 6,023,727 A | 2/2000 | Barrett et al. | |
| 6,067,483 A | 5/2000 | Fesmire et al. | |
| 6,138,241 A * | 10/2000 | Eckel et al. ................. 713/300 |
| 6,366,583 B2 | 4/2002 | Rowett et al. | |
| 6,415,344 B1 | 7/2002 | Jones et al. | |
| 6,609,163 B1 | 8/2003 | Nguyen et al. | |
| 6,677,779 B1 | 1/2004 | Su et al. | |
| 6,813,525 B2 | 11/2004 | Reid et al. | |
| 6,851,621 B1 | 2/2005 | Wacker et al. | |
| 7,136,724 B2 | 11/2006 | Enberg | |
| 7,509,399 B1 * | 3/2009 | Kar et al. ................... 709/220 |

(Continued)

*Primary Examiner*—Nathan Flynn
*Assistant Examiner*—Mohammad A Siddiqi
(74) *Attorney, Agent, or Firm*—Shumaker & Sieffert, P.A.

(57) ABSTRACT

A device comprises a programmable communication interface and a processor. The programmable communication interface communicates data via a set of signals. The processor configures the programmable communication interface to communicate the data in accordance with a programmed override state for at least one of the signals and actual states for the remaining signals. The programmable communication interface may be configured, for example, to programmably treat an overridden signal as asserted or de-asserted regardless of actual voltages present on one or more electrical connectors associated with the overridden signal. As a result, incorrectly wired electrical connectors of the programmable communication interface may be programmably overridden. Consequently, a technician need not manually rewire the programmable communication interface.

18 Claims, 6 Drawing Sheets

U.S. PATENT DOCUMENTS

2004/0081186 A1 4/2004 Warren et al.
2004/0251743 A1 12/2004 Sadowski et al.
2005/0193103 A1 9/2005 Drabik

* cited by examiner

PROGRAMMABLE COMMUNICATION INTERFACE

This application is a Continuation of Appl. No. 10/431,750 filed May 8, 2003 now U.S. Pat. No. 7,509,399, issued Mar. 24, 2009, the entire content of which is incorporated herein by reference.

TECHNICAL FIELD

The invention relates to communication interfaces, and more particularly, to configuration of communication interfaces.

BACKGROUND

Conventional computing devices often incorporate one or more communication interfaces for communicating with other devices. Often these communication interfaces conform to communication standards, such as RS-232, RS-422, X.25, V.35 and IEEE 1394 communication standards. Communication standards are established in an attempt to assure that the computing devices conforming to one of the standards will be able to successfully communicate with each other. For example, each communication standard typically defines a specific set of input and output signals, e.g., data signals, clock signals, flow control signals, and the like.

It is common for a device to implement only a subset of the signals defined by a communication standard. For example, a device may implement a subset of the RS-232 standard by providing compliant clock and data signals, while not implementing the flow control signals. Moreover, it is common for fully compliant and partially compliant devices to be connected. In this situation, only a subset of the signals provided by the fully compliant device is used for communication between the fully and partially compliant devices. As a result, a technician or other individual often must manually wire electrical connectors, e.g., pins, that carry the unused signals of the fully compliant device to appropriate voltage levels for the devices to properly communicate. For example, unused flow control signals may need to be manually wired to appropriate voltages, e.g., ±12 volts, to permit communication.

For complex communication interfaces, this manual wiring process may be relatively complex and labor-intensive, which may lead to incorrect wiring of the interface. As a result, errors or complete communication failure may occur, and the technician may be forced to return to the devices and attempt to identify and manually correct the wiring error.

SUMMARY

In general, the invention is directed to techniques for programmably configuring a communication interface of a device. In particular, the techniques allow a client to programmably set "override states" for one or more signals of the communication interface. Once set, the programmable communication interface operates in accordance with actual states for any non-overridden signals and the programmed override states for overridden signals. Consequently, operation of the communication interface is unaffected by the actual states of the overridden signals, which may be incorrectly wired. In this manner, the programmable communication interface can easily be utilized in a variety of communication environments, including those environments in which one or more devices implement only a subset of the signals specified by a communication standard.

As used herein, an override state for a signal refers to a logical characteristic of the signal to be used in place of a physical characteristic of the signal. As one example, the programmable communication interface may be configured to programmably treat a signal as asserted or de-asserted in order to override an actual voltages present on one or more electrical connectors associated with the signal. As a result, an unused signal for which an associated electrical connector is mistakenly wired to an incorrect voltage level may be programmably overridden. Consequently, a technician need not manually rewire the interface.

As another example, an override state may be programmably set to invert a polarity of a signal. For example, a signal may be conveyed by a polarity defined by voltage levels of two electrical connectors. If these electrical connectors are incorrectly reversed, the programmable communication interface may be configured to override the polarity of the electrical connectors, i.e., invert the signal, without requiring the technician to manually rewire the electrical connectors.

Consistent with the principles of the invention, a device may incorporate a user interface that supports a command syntax for remote configuration of the communication interface. A client, such as a local user, remote user, automated script, or the like, may interact with the user interface, and provide commands in accordance with the supported syntax to programmably configure the communication interface. As a result, override states may be defined for one or more of the signals to remotely correct wiring errors.

In one embodiment, a method comprises programmably setting an override state for one of a plurality of signals of a communication interface. The method further comprises communicating data via the communication interface in accordance with the programmed override state for the overridden one of the signals and actual states for the non-overridden signals.

In another embodiment, a device comprises a programmable communication interface and a processor. The programmable communication interface communicates data via a set of signals. The processor configures the programmable communication interface to communicate the data in accordance with a programmed override state for at least one of the signals and actual states for the remaining signals.

In another embodiment, a non-transitory computer readable storage medium comprises instructions to cause a processor to programmably set an override state for at least one of a plurality of signals of a communication interface. The instructions further cause the processor to communicate data via the communication interface in accordance with the programmed override state for the overridden one of the signals and actual states for the non-overridden signals.

The invention may provide one or more advantages. For example, the programmable communication interface can easily be utilized in a variety of communication environments, including those environments in which one or more devices implement less than all of the signals specified by an industry standard. Moreover, the programmable communication interface allows a client, e.g., a technician or automated script, to programmably correct any wiring errors that may be present within the programmable communication interface. In this situation, the incorrectly wired electrical connectors need not be physically rewired, but signals associated with the electrical connectors may be programmably overridden.

Moreover, the user interface and associated command syntax allow the client to easily programmably override the signal from a remote location. As a result, the client may easily correct any wiring errors without having to physically travel to the device. Furthermore, remote automated scripts may be used to configure the device, thus allow wiring errors to be corrected in a more efficient manner in comparison with manually rewiring the communication interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
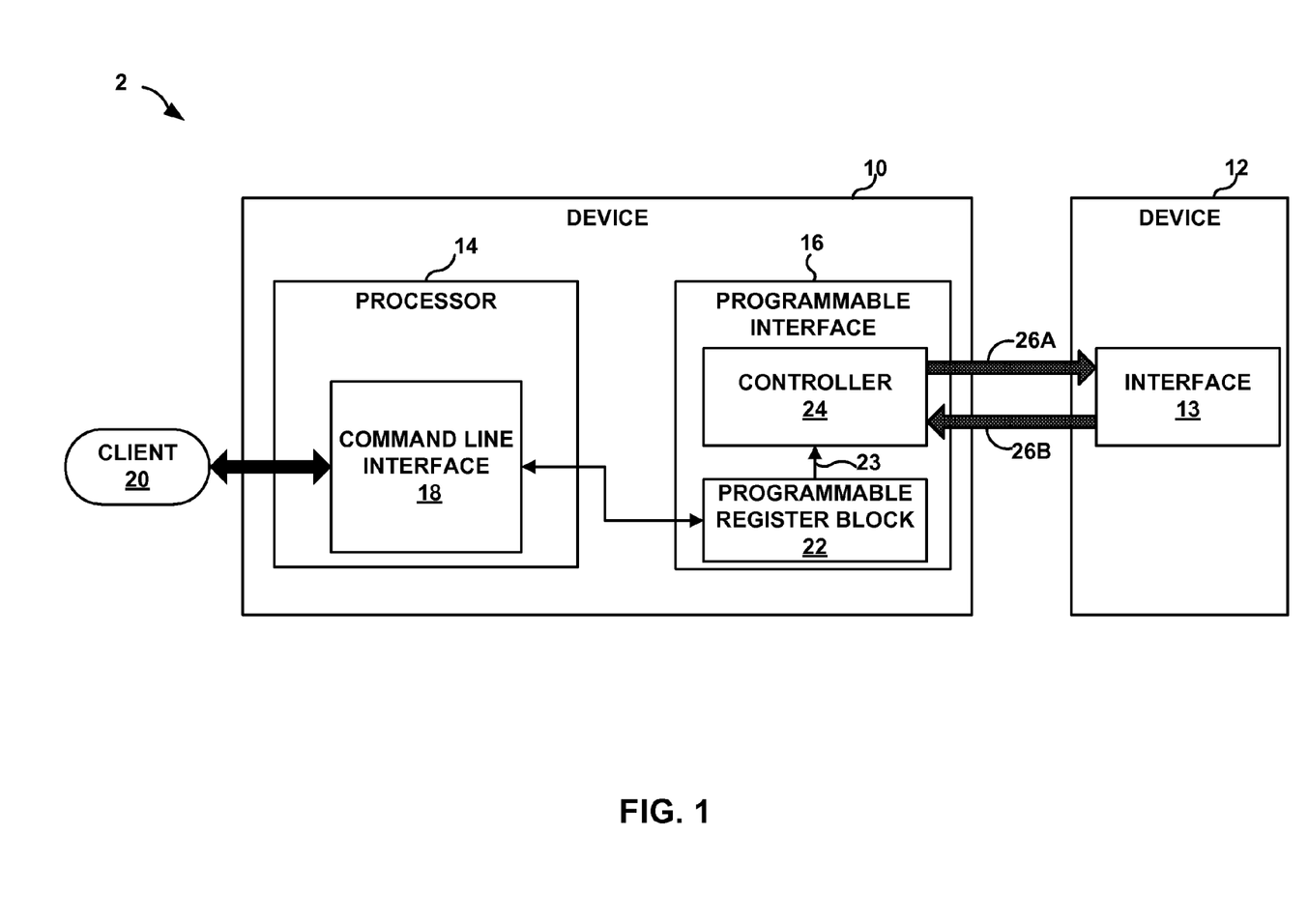
FIG. 1 is a block diagram illustrating an example system in which a device includes a programmable communication interface in accordance with the principles of the invention.

FIG. 1 is a block diagram illustrating a system 2 in which a device 10 communicates with a device 12 via a programmable interface 16 in accordance with the principles of the invention. In general, devices 10, 12 represent any device capable of communication. For example, devices 10, 12 may be computing devices, such as desktop computers, laptop computers, personal digital assistants, and the like. In addition, devices 10, 12 may be network devices, such as printers, servers, hubs, switches, routers, and the like.

Programmable interface 16 implements output signals 26A and input signals 26B (collectively "signals 26") for communication with interface 13 of device 12. In particular, programmable interface 16 transmits and receives signals 26 by one or more electrical connectors (not shown), such as an electrical pin. In the example of FIG. 1, device 10 may be fully compliant with a communication standard, and signals 26 implemented by programmable interface 16 may be all of the signals defined by the standard. Further, in the example of FIG. 1, device 12 may be partially compliant with the standard, and implements only a subset of the signals defined by a communication standard.

As a result, some of signals 26 may be associated with electrical connectors that are wired to specific voltage levels. For example, device 12 may not implement flow control signals. Consequently, a portion of input signals 26B corresponding to the unimplemented flow control signals may be wired to voltage levels that are necessary to permit communication between devices 10, 12. Although described herein with reference to fully and partially "compliant" devices, the invention is not limited by reference to communication standards or their requirements. Instead, a device may operate consistent with the principles of the invention in any case where the device communicates with another device that does not implement signals 26 implemented by the first device.

In general, programmable interface 16 controls communications with device 12 and, in particular, controls signals 26 in accordance with controller 24. More specifically, controller 24 defines and operates in accordance with a number of states to control transmission and reception of signals 26. In the exemplary embodiment, device 10 includes a processor 14 to configure programmable interface 16 and, in particular, define "override states" for signals 26 that may be associated with incorrectly wired electrical connectors. Programmable interface 16 includes a programmable register block 22 to store data from processor 14 that defines any override states for signals 26.

In accordance with the stored data, programmable register block 22 generates override signals 23 and provides override signals 23 to controller 24. Controller 24 may, for example, read the data stored by programmable register block 22. Controller 24 controls operation of interface 16 based on signals 26 and override signals 23. In particular, controller 24 operates in accordance with actual states for any non-overridden signals 26, and the programmed override states for any of signals 26 that have been overridden. Consequently, operation of programmable interface 16 is unaffected by the actual states of those signals 26 that have been incorrectly wired and have been programmably overridden.

As one example, processor 14 may configure programmable register block 22 to define an override state for one of signals 26 to override an actual voltage present on an electrical connector associated with that signal. This may, for example, be beneficial in a situation where the overridden one of signals 26 is not provided by device 12, and a technician has wired the electrical connector associated with the overridden one of signals 26 to an incorrect voltage level. In this situation, processor 12 may configure programmable register block 22 to override the incorrect voltage level, and the technician need not manually rewire programmable interface 16.

As another example, processor 14 may configure programmable register block 22 to define an override state to override a polarity of one of signals 26. This may be beneficial in a situation where the overridden one of signals 26 is defined by a plurality of electrical connectors, and the technician has incorrectly reversed the electrical connectors. In this situation, processor 12 may configure programmable register block 22 to programmably correct the polarity without requiring the technician to manually rewire the associated electrical connectors.

In one embodiment, processor 14 presents a command line interface (CLI) 18 by which a client 20 may configure programmable register block 22. In particular, CLI 18 supports a command syntax by which client 20 specifies override states for signals 26. Client 20 may be a technician located at or near device 10, a remote user interacting within a computing device coupled to device 10 via a network, a computer script or batch process executing remotely, or the like.

As described in detail, CLI 18 supports a command syntax that supports two modes by which client 20 programmably configures override states for signals 26. In the first mode, CLI 18 accepts commands to override polarities for signals 26. In the second mode, CLI 18 accepts commands to override voltage levels for signals 26.

To enter the first mode, client 20 provides an OPTIONS command, which may take a variety of forms based on the type of interface. If the communication interface conforms to the RS-232 standard, client 20 enters the OPTIONS command at a command line as follows:

user@host>serial-options.

Next, client 20 may enter commands for overriding the polarity of signals 26 on device 10 according to the following syntax:

<signal name>-polarity (positive|negative).

The <signal name> portion of the above command syntax represents a name associated with one of signals 26 by programmable interface 16. For example, programmable interface 16 may associate one of signals 26 with the name "DCD" for Data Carrier Detect as defined by the RS-232 standard. The parameter following <signal name>-polarity represents one of the two available polarity settings, positive and negative. Thus, to override the polarity of one of signals 26 associated with the name "DCD," client 20 may enter the following command at command prompt presented by CLI 18:

user@host>dcd-polarity positive.

Additionally, client 20 may direct CLI 18 to accept commands to override voltage levels for signals 26 by providing a CONTROL-LEADS command at a command line as follows:

user@host>control-leads.

Next, client 20 may provide commands instructing programmable interface 16 to define override states for signals 26. The command syntax for defining override states for input signals 26B is as follows:

<signal name>(ignore|normal|require).

Similarly, the command syntax for output signals 26A is:

<signal name>(assert|de-assert|normal).

In both of these command syntaxes, the parameter <signal name> specifies a name associated with one of signals 26, as described above. In each case, the signal name is followed by a parameter specifying the override state to be defined for the identified one of signals 26. In particular, for input signals 26B, client 20 may define override states of IGNORE, NORMAL, and REQUIRE. For output signals 26A, client 20 may define override states of ASSERT, DE-ASSERT, and NORMAL.

For those input signals 26B for which an override state of IGNORE is designated, programmable interface 16 will not react to input from that signal. In contrast, for those input signals 26B for which an override state of NORMAL or REQUIRED is designated, programmable interface 16 responds to the actual states, e.g., polarities and voltages, sensed from the electrical connectors for those signals. In NORMAL mode, the state of the signals is used only to control data transmission (in the case of DSR and CTS) or reception (in the case of CD) by the controller and do not effect a link state. In REQUIRED mode, the state of the signals is used to control the link state. The link state defines to processor 14 whether the link between device 10 and device 12 is up or down. All data transmissions are halted when the link state is down, regardless of all other control signals.

An override state of NORMAL can also be designated for output signals, such as output signal 26A. For this output signal 26A, controller 24 can assert or de-assert the signal on the electrical connector depending on the ability of processor 14 to process the incoming receive data from device 12. The processor may need to indicate to device 12 to temporarily halt data transmission if the processor is unable to process all the incoming data from the device 12. While in NORMAL mode, controller 24 can toggle the output signal 26A based on the ability of processor 14 to process the data, without intervention from programmable register block 22.

For an output signal 26A for which an override state of ASSERT is designated, programmable register block 22 generates one or more respective override signals 23 to represent that one of output signals 26A as asserted logical values. For example, programmable register block 22 may generate override signals 23 that represent a positive electrical connector set to a high-level voltage ($V_H$) and a negative electrical connector set to a low-level voltage ($V_L$). Similarly, for an output signal 26A for which an override state of DE-ASSERT is designated, programmable register block 22 generates one or more respective override signals 23 to represent that one of output signals 26A as set to a de-asserted logical value. For example, programmable register block 22 may generate override signals 23 that represent a positive electrical connector set to a low-level voltage ($V_L$) and a negative electrical connector set to a high-level voltage ($V_H$).

The following example pseudocode illustrates a set of commands provided by client 20 in accordance with the command syntax supported by device 10 to set the polarity of one of signals 26 associated with the name DCD, and to set an override state of ASSERT for a different one of signals 26 associated with the name DTR:

user@host>serial-options
user@host>dcd-polarity positive
user@host>control-leads
user@host>dtr assert.

Upon receiving the commands, CLI 18 processes the commands and configures programmable register block 22, as described in more detail below.

Figure 2A:
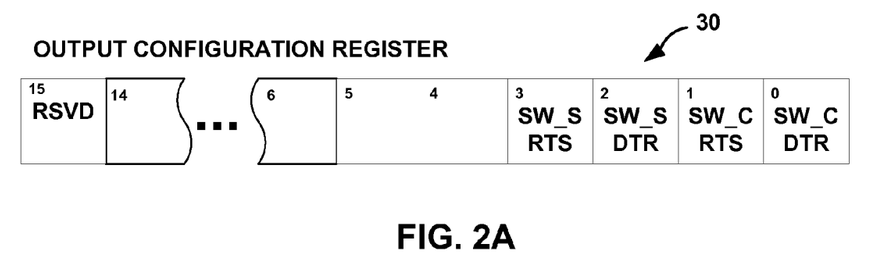
FIGS. 2A-2C are block diagrams of exemplary programmable registers to store configuration data for defining override states for signals implemented by the programmable communication interface.

FIG. 2A is an example of a programmable register 30 of programmable register block 22 (FIG. 1) that stores configuration information for defining override states for output signals 26A of programmable interface 16. In the illustrated example, register 30 comprises a 16-bit register for storing two different types of configuration bits for each of output signals 26A that may be overridden. The first bit type, a software control (SW_C) bit, indicates whether controller 24 should use the actual state of the respective one of output signals 26A, or whether an override state is to be used. As an example, consider bit zero of register 30, which indicates whether an override state for one of output signals 26A associated with the name DTR has been defined. If this bit, SW_C DTR bit, is false then no override state has been defined. If, however, the SW_C DTR bit is set to a logical true, then an override state has been defined, and controller 24 accesses the second bit type, SW_S DRT, to determine the particular override state to use for the respective one of output signals 26A.

The second bit type, software set (SW_S), indicates whether the respective one of output signals 26A has been overridden with an asserted or de-asserted state. If, for example, commands from client 20 have designated an override state of ASSERT for the DTR signal, processor 14 sets SW_S DTR, i.e., the third bit of register 30, to a logical true. If, however, client 20 has designated an override state of DE-ASSERT for the DTR signal, processor 14 sets SW_S DTR, i.e., the third bit of register 30, to a logical false.

In this way, a single command from client 20 can configure the override state of a given one of output signals 26A. If a non-overridden state is required, i.e., the actual state, client 20 can provide an override command that specifies a NORMAL parameter, as described above, causing processor 14 to set the respective SW_C bit of register 30 to false.

Figure 2B:
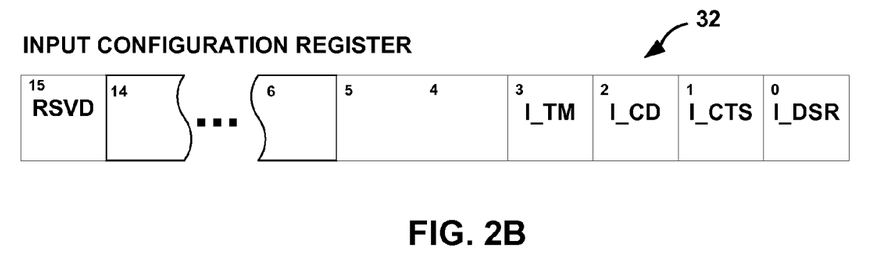

FIG. 2B is another example of a programmable register 30 of programmable register block 22 (FIG. 1) that stores configuration information for defining override states for input signals 26B of programmable interface 16. In the illustrated example, register 32 comprises a 16-bit register for storing data that indicates whether an override state has been defined for each of input signals 26B. In particular, a logical true in one of the bits indicates that the corresponding one of input signals 26B should be ignored, i.e., that the actual state of the input signal should not affect controller 24. For example, if the IGNORE DSR (I_DSR) bit is set to logical true, controller 24 disregards the associated input signal 26B with regard to flow control.

Figure 2C:
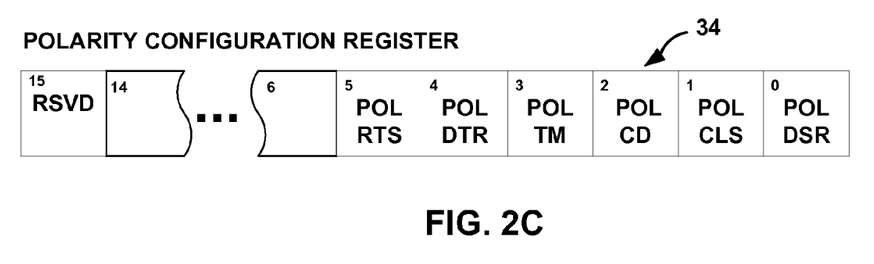

FIG. 2C is another example of a programmable register 34 of programmable register block 22 (FIG. 1) that stores configuration information for defining override states to override polarities of signals 26. In this example, register 34, like the other registers 30, 32, is shown as a 16-bit register for storing data that indicates whether an override state has been defined for the respective polarity of each of signals 26. In particular, a logical true in one of the bits indicates that the polarity for the corresponding one of signals 26 should be positive, i.e., unmodified. Conversely, a logical false in one of the bits indicates that the polarity for the corresponding one of signals 26 should be overridden to be a negative polarity. Consequently, controller 24 may logically invert any values received from the overridden signal. This may be beneficial in a situation where the overridden one of signals 26 is defined by a plurality of electrical connectors, and the technician has incorrectly reversed the electrical connectors. In this situation, processor 12 may configure programmable register block 22 to programmably correct the polarity without requiring the technician to manually rewire the associated electrical connectors.

Figure 3:
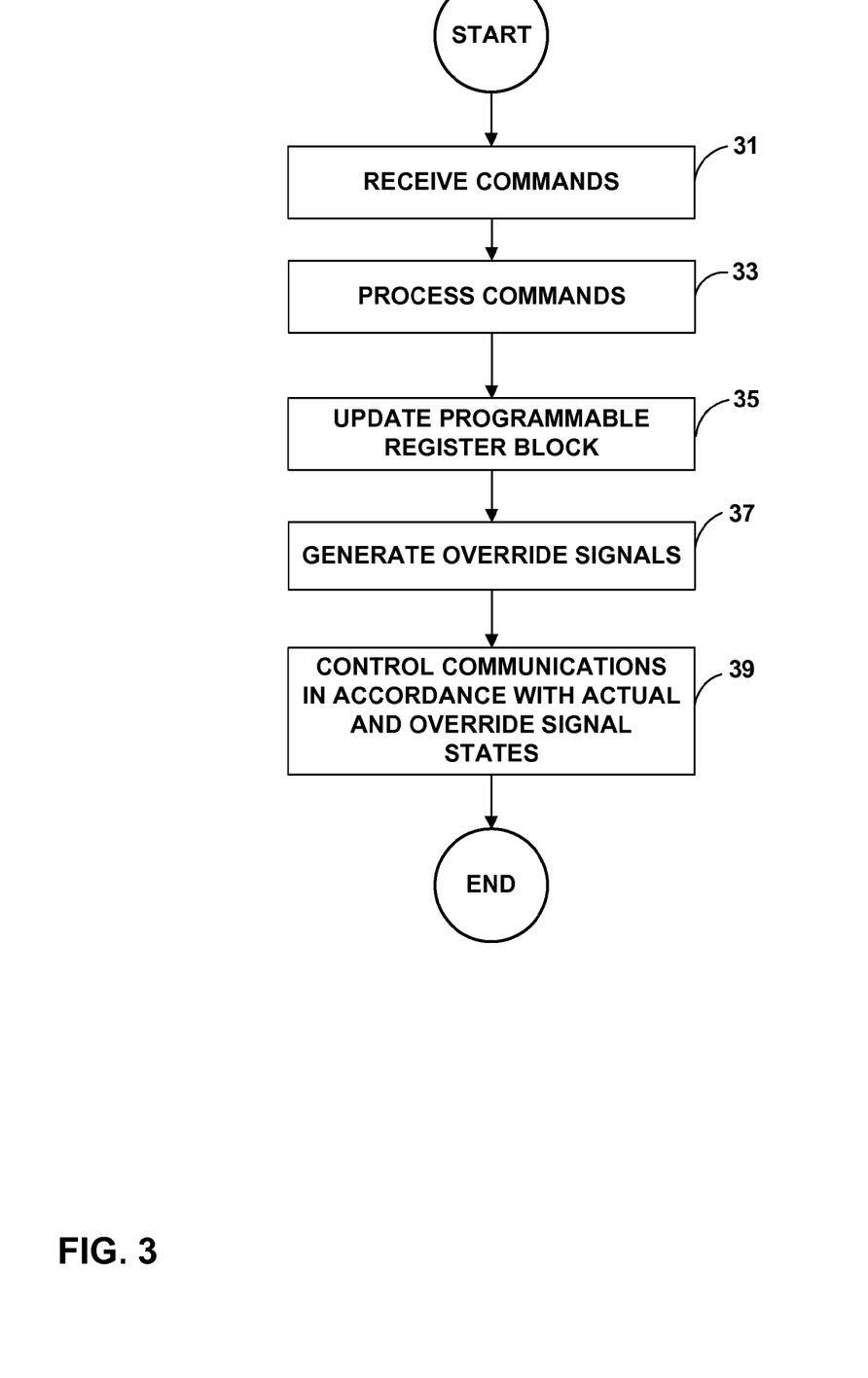
FIG. 3 is a flowchart illustrating exemplary operation of the programmable interface in accordance with the principles of the invention.

FIG. 3 is a flowchart illustrating exemplary operation of programmable interface 16 (FIG. 1) in accordance with the principles of the invention. Initially, processor 14 presents CLI 18 to client 20, and receives configuration commands from client 20 (31). As described above, CLI 18 supports a command syntax by which client 20 specifies override states for signals 26.

Processor 14 processes the received commands (33), and generates data for configuring programmable register block 22 (35). As described, programmable register block 22 may include a plurality of programmable registers, e.g., registers 30, 32, 34, for storing the data.

Based on the configuration data, programmable register block 22 generates override signals 23 and provides the override signals to controller 24 (37). Controller 24 may, for example, read the data stored by programmable register block 22.

Based on the override states defined within programmable register block 22, controller 24 controls operation of interface 16 and communication with device 12. In particular, controller 24 operates in accordance with actual states for any non-overridden signals 26, and the programmed override states for any of signals 26 that have been overridden within register block 22 (39).

Figure 4:
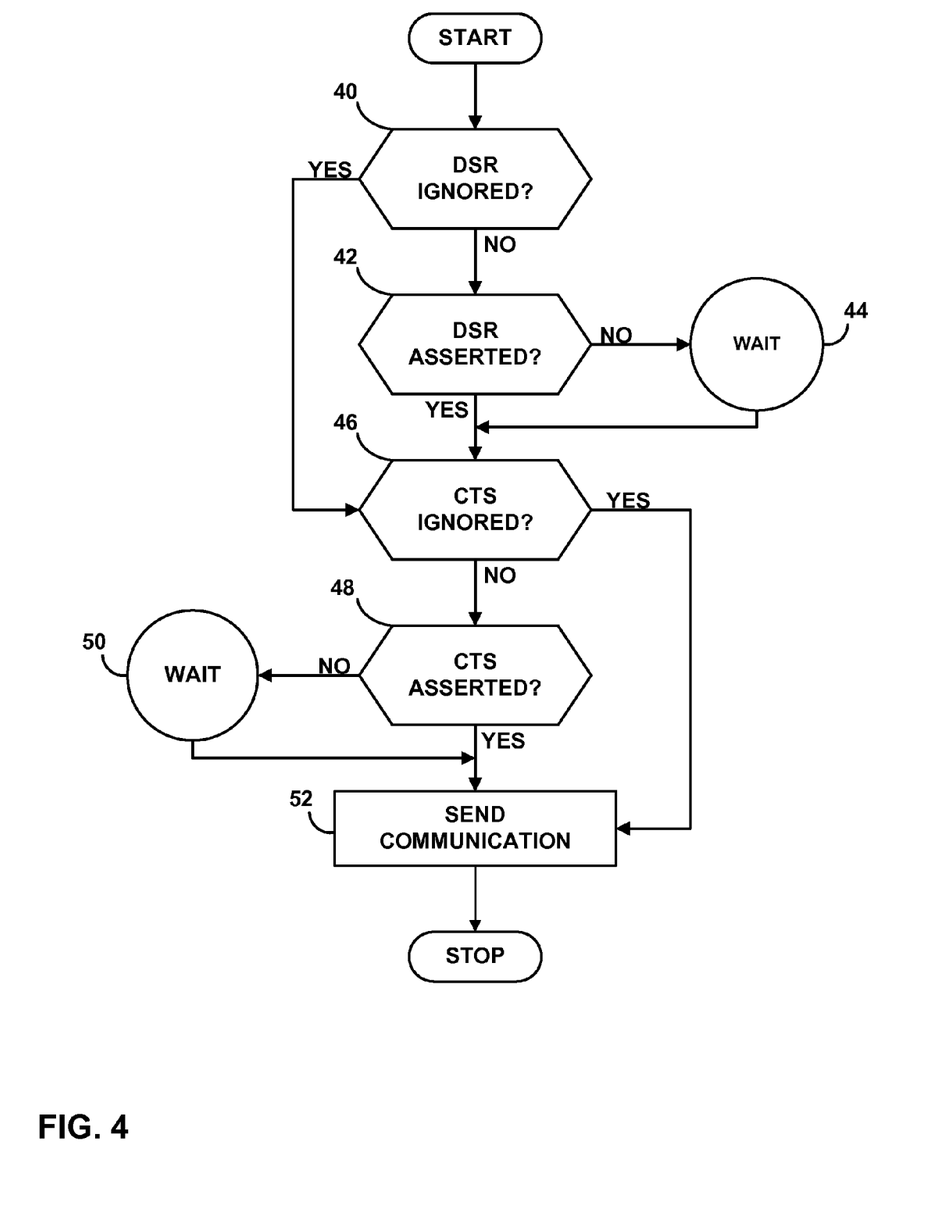
FIGS. 4 and 5 are flowcharts illustrating exemplary operation of a controller within the programmable interface.

FIG. 4 is a flowchart illustrating exemplary operation of controller 24 (FIG. 1) of programmable interface 16. In particular, the flowchart of FIG. 4 illustrates operation of controller 24 in accordance with actual states for non-overridden signals 26, and programmed override states for an exemplary set of signals 26 that have been overridden within register block 22. In this example, signals 26 include flow control signals Data Set Ready (DSR) and Clear To Send (CTS), which are required to send a communication as specified by the RS-232 communication standard. Both DSR and CTS are for purposes of illustration only.

Initially, controller 24 accesses register block 22 to receive override signals 23 and determine whether the DSR signal is ignored during operation of programmable interface 16 (40). For example, controller 24 may read register 32 (FIG. 2B) of register block 22, and apply a mask or other bit test to the received data to determine whether the I_DSR bit indicates whether the DSR signal should be ignored or not ignored.

If the DSR signal is ignored, i.e., the I_DSR bit is asserted, controller 24 ignores the actual state of the DSR signal. More specifically, controller 24 "ignores" the DSR signal by not allowing the actual state of the DSR signal to influence the execution order of a state machine maintained by controller 24. As a result, controller 24 modifies the operation of the state machine to disregard the actual state of the DSR signal.

If the DSR signal is not ignored, i.e., the I_DSR bit is not asserted, controller 24 processes the actual state of the DSR signal. In particular, controller 24 reads the actual state of the DSR signal, and determines whether the DSR signal is asserted (42). If the DSR signal is not asserted, controller 24 executes a state to wait for the assertion of the DSR signal by device 12 (44).

When the DSR signal is either asserted by device 12 or has been programmably ignored, controller 24 accesses register block 22 to determine whether the CTS signal is ignored for operation of programmable interface 16 (46). For example, controller 24 may read register 32 and apply a mask or other bit test to determine whether the I_CTS bit indicates whether the CTS signal should be ignored or not ignored.

If the CTS signal is ignored, i.e., the I_CTS bit is asserted, controller 24 ignores the actual state of the CTS signal. As with the DSR signal, controller 24 "ignores" the CTS signal by modifying operation of the state machine to disregard the actual state of the CTS signal and continues with the communication.

If the CTS signal is not ignored, i.e., the I_CTS bit is not asserted, controller 24 processes the actual state of the CTS signal. In particular, controller 24 reads the actual state of the CTS signal, and determines whether the CTS signal is asserted (48). If the CTS signal is not asserted, controller 24 executes a state to wait for the assertion of the CTS signal by device 12 (50).

When the CTS signal is either asserted by device 12 or has been programmably ignored, controller 24 drives output signals 26A to output the current communication (52). In this manner, override states can be programmably set to override the actual states of individual output signals 26A, such as the illustrative flow control signals DTR and CTS.

Figure 5:
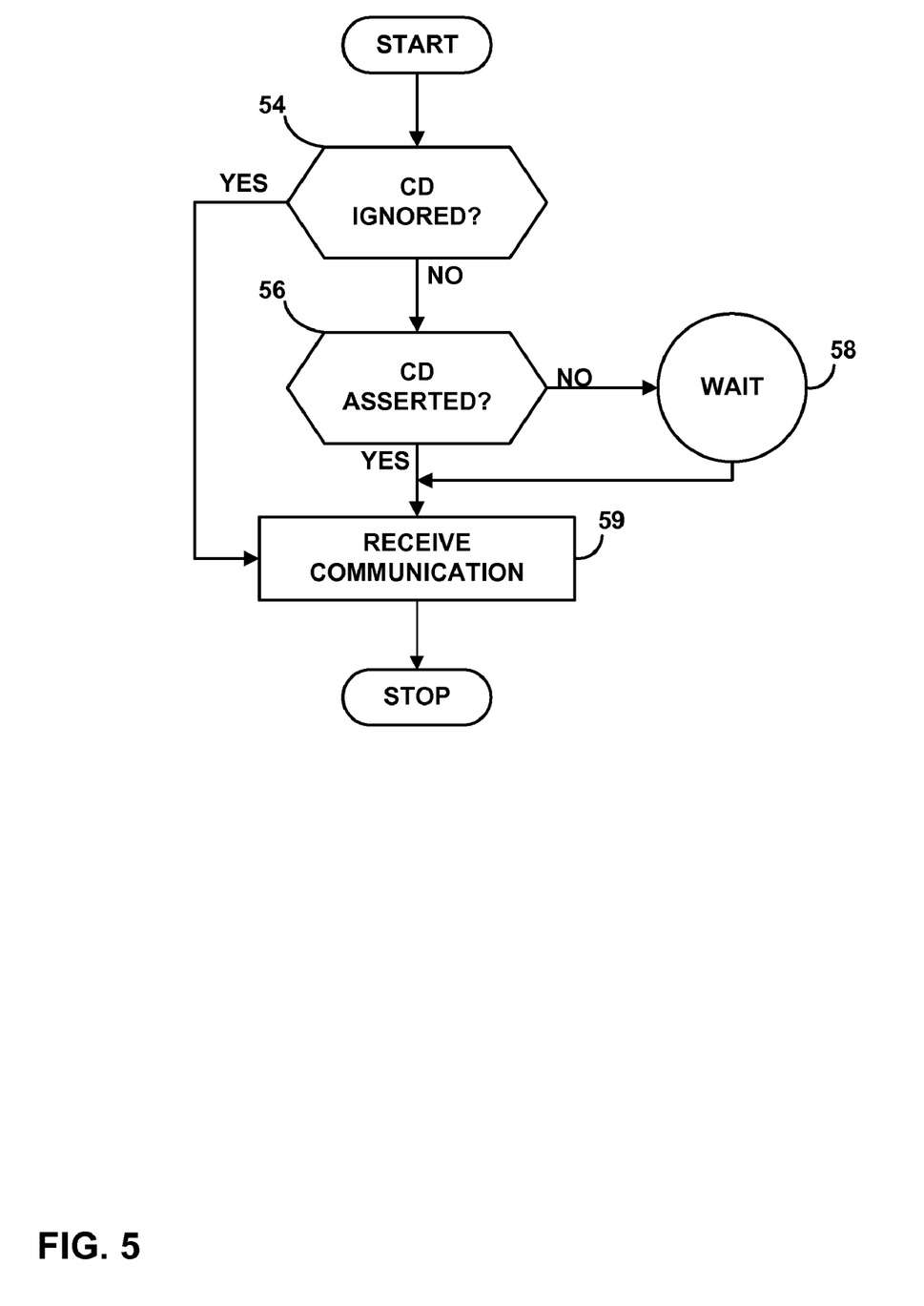

FIG. 5 is another flowchart illustrating exemplary operation of controller 24 (FIG. 1) of programmable interface 16. In particular, the flowchart of FIG. 5 illustrates operation of controller 24 in accordance with actual states for non-overridden signals 26, and programmed override states for an exemplary set of signals 26 that have been overridden within register block 22. In this example, signals 26 include flow control signals Carrier Detect (CD), which is required to receive a communication as specified by the RS-232 communication standard. CD is also for purposes of illustration only.

Initially, controller 24 accesses register block 22 to receive override signals 23 and determine whether the CD signal is ignored during operation of programmable interface 16 (54). For example, controller 24 may read register 32 (FIG. 2B) of register block 22, and apply a mask or other bit test to the received data to determine whether the I_CD bit indicates whether the CD signal should be ignored or not ignored.

If the CD signal is ignored, i.e., the I_CD bit is asserted, controller 24 ignores the actual state of the CD signal. More specifically, controller 24 "ignores" the CD signal by modifying operation of the state machine to disregard the actual state of the CD signal and continues with the communication.

If the CD signal is not ignored, i.e., the I_CD bit is not asserted, controller 24 processes the actual state of the CD signal. In particular, controller 24 reads the actual state of the CD signal, and determines whether the CD signal is asserted (56). If the CD signal is not asserted, controller 24 executes a state to wait for the assertion of the CD signal by device 12 (58).

When the CD signal is either asserted by device 12 or has been programmably ignored, controller 24 receives the current communication from signals 26B (59). In this manner, override states can be programmably set to override the actual states of individual input signals 26B, such as the illustrative flow control signal CD.

The ability to define override states for signals 26, and thereby programmatically influence the operation of controller 24 allows device 10 to connect to a wide variety of devices, including those devices that only support a subset of signals defined by a communication standard. Moreover, this flexibility allows for wiring errors to be programmatically corrected, rather than requiring physical rewiring of programmable interface 16. For example, if device 12 does not support the exemplary flow control signals DSR, CD and CTS, and a technician has incorrectly wired any of the corresponding electrical connectors, then communications between device 10 and device 12 may fail. Rather than debugging and rewiring the incorrectly wired electrical connectors, client 20 may configure programmable interface 14 with a programmed override state for the corresponding signals.

Figure 6:
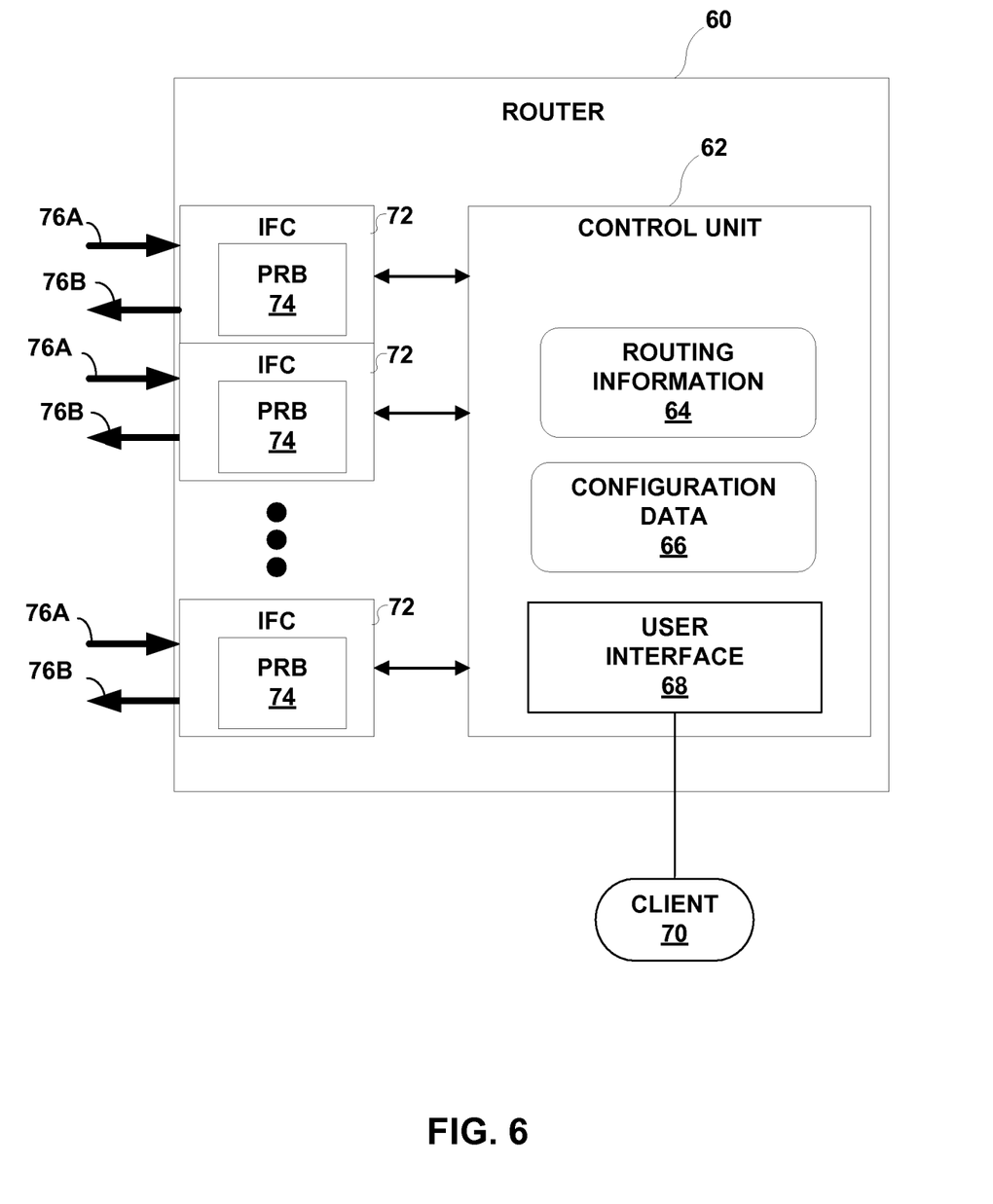
FIG. 6 is a block diagram illustrating an example network router that supports programmable communication interfaces consistent with the principles of the invention.

FIG. 6 is a block diagram illustrating an example network router 60 that supports programmable communication interfaces consistent with the principles of the invention. Router 60 includes a set of one or more interface cards (IFCs) 72 that receive and send communications via input signals 76A and output signals 76B (collectively "signals 76"), respectively. As illustrated, one or more of the IFCs 72 contain a respective programmable register block (PRB) 74 that contains programmable registers to store configuration data for defining override states for signals 76. One or more of IFCs 72 may comprise interface cards for sending and receiving data packets to and from a network. In addition, one or more of IFCs 72 may support direct communication with other devices via a communication standard.

Router 60 includes a control unit 62 that maintains routing information 64. Routing information 64 describes the topology the network and, in particular, routes through the network. Routing information 64 may include, for example, route data that describes various routes within the network, and corresponding next hop data indicating appropriate neighboring devices within the network for each of the routes. Control unit 62 maintains routing information 64 to accurately reflect the topology of the network. In general, router 60 receives a packet via inbound signals 76A, control unit 62 determines the destination address of the packet and outputs the packet on outbound signals link 76B based on the destination.

Control unit 62 may receive configuration input from a client 70 via a user interface 68. User interface 68 may be a CLI or other suitable interface, for processing user-provided or script-driven commands. Control unit 62 stores the configuration input received from client 70 as configuration data 66, which may take the form of a text file, such as an ASCII file. Alternatively, control unit 62 may process the configuration input and generate configuration data 66 in any one of a number of forms, such as one or more databases, tables, data structures, or the like.

In response to receiving a configure command, control unit 62 may parse the command, and place router 60 in a configuration mode for receiving configuration data 66 from client 70. Configuration data 66 may take the form of one or more commands for adding new settings to the current configuration of router 60, commands for deleting or modifying existing settings of the current configuration, or combinations thereof. Upon receiving a commit command, control unit 62 applies configuration data 66 to router 60.

Configuration data 66 may include any of the commands described above to set override states pertaining to signals 76. Client 70 may submit commands that identify individual ones of IFCs 72 and, in particular, configure any of the programmable registers contained within PRBs 74 of the identified IFCs.

Once the configuration data is applied, IFCs 72 operate as described above in reference to programmable interface 16. In particular, based on the configuration data stored with each of PRBs 74, IFCs 72 control communication via signals 76 in accordance with actual states for any non-overridden signals 76, and the programmed override states for any of signals 76 that have been overridden within the respective PRBs 74. As described, the IFCs 72 may be configured to programmably assert or de-assert individual signals 76 to override actual voltages present on electrical connectors associated with the signals. As a result, an unused one of signals 76 for which the associated electrical connector is incorrectly wired may be programmably overridden. As another example, an override state may be programmably set to change a polarity of individual signals 76.

Various embodiments of the invention have been described. For example, programmable interface methods and apparatus consistent with the principles of the invention may be used with any type of interface to a system. These and other embodiments are within the scope of the following claims.

The invention claimed is:

1. A method for operating an industry standard serial communication interface comprising:
   programmably setting with a processor an override state for one of a plurality of signals of the industry standard serial communication interface for communication between network devices in response to a command received from a client via a user interface, wherein the command specifies a respective name associated with the overridden one of the signals and identifies, from a set of interface cards, an interface card of the router that includes the industry standard serial communication interface, and wherein the overridden one of the signals comprises a flow control signal;
   storing configuration data that defines the override state to a programmable register of the industry standard serial communication interface included within the identified interface card, wherein the override state defines a logical characteristic for the overridden one of the signals to be used in place of a physical characteristic of an associated one of electrical connectors of the communication interface when the associated one of the electrical connectors conveys the overridden one of the signals; and
   communicating data with a controller of the industry standard serial communication interface via the electrical connectors in accordance with the programmed override state for the overridden one of the signals and actual states for the non-overridden signals, wherein communicating data comprises controlling a flow of the data through the serial communication interface in accordance with the actual states for the non-overridden signals and the programmed override state for the overridden flow control signal.

2. The method of claim 1, wherein storing the configuration data comprises writing the configuration data to the programmable register based on the command.

3. The method of claim 1, wherein programmably setting the override state comprises programmably asserting and de-asserting the overridden one of the signals to override an actual voltage present on the electrical connector associated with the overridden one of the signals.

4. The method of claim 3, wherein the command further specifies a parameter to selectively assert and de-assert the overridden one of the signals,
   wherein the configuration data further indicates whether the overridden one of the signal is to be treated as asserted or de-asserted based on the command, and
   wherein programmably asserting and de-asserting the overridden one of the signals comprises:
   receiving the command from the client via the interface that specifies the parameter to selectively assert and de-assert the overridden one of the signals; and
   storing the configuration data that further indicates whether the overridden one of the signals is to be treated as asserted or de-asserted based on the command.

5. The method of claim 1, wherein programmably setting an override state comprises programmably setting an override polarity for the overridden one of the signals, and wherein communicating data comprises selectively inverting the overridden one of the signals based on the override polarity.

6. The method of claim 5, wherein the command further specifies a polarity parameter,
   wherein the configuration data further defines the override polarity based on the command, and
   wherein programmably setting an override polarity comprises:
   receiving the command from the client via the interface that specifies the polarity parameter; and
   storing the configuration data that defines the override polarity based on the command.

7. The method of claim 1, wherein programmably setting the override state comprises programmably specifying that the actual state associated with the overridden one of the signals is to be disregarded when communicating the data.

8. A router comprising:
   a set of interface cards, wherein one of the interface cards comprises a programmable serial communication interface that complies with an industry standard and includes a controller to communicate data via a set of signals with another device in accordance with the industry standard,
   wherein the industry standard serial communication interface also includes a programmable register that defines a programmable override state; and
   a processor to configure the programmable serial communication interface by executing instructions to:
   receive a command that specifies a respective name associated with one of the signals; and
   store configuration data that defines the override state to the programmable register such that the controller communicates the data in accordance with the programmed override state for at least one of the signals and actual states for the remaining signals,
   wherein the configuration data sets an override polarity for the overridden one of the signals, and
   wherein the programmable serial communication interface communicates the data by selectively inverting the overridden one of the signals based on the override polarity.

9. The router of claim 8, wherein the processor presents the interface by presenting a user interface to accept a command from the client, and configures the programmable serial communication interface based on the command.

10. The router of claim 8, wherein the processor programmably asserts and de-asserts the overridden one of the signals to override an actual voltage present on the electrical connector associated with the overridden one of the signals.

11. The router of claim 10, wherein the command further specifies a parameter to selectively assert and de-assert the overridden one of the signals.

12. The router of claim 8, wherein the command further specifies a polarity parameter.

13. The router of claim 8,
   wherein the controller of the programmable serial communication interface maintains a state machine and communicates the data via the set of signals in accordance with the state machine,
   wherein the controller further receives override signals from the programmable register based on the configuration data that define the override state, and
   wherein the override signals modify operation of the state machine maintained by the controller causing the controller to communicate the data in accordance with the programmed override state for at least one of the signals and the actual state for the remaining signals.

14. A non-transitory computer readable storage medium comprising instructions to cause a processor to:
   programmably set with a processor an override state for one of a plurality of signals of the industry standard serial communication interface for communication between network devices in response to a command received from client via a user interface, wherein the command specifies a respective name associated with the overridden one of the signals and identifies, from a set of interface cards, an interface card of the router that includes the industry standard serial communication interface;
   store configuration data that defines the override state to a programmable register of the industry standard serial communication interface included within the identified interface card, wherein the override state defines a logical characteristic for the overridden one of the signals to be used in place of a physical characteristic of an associated one of electrical connectors of the communication interface when the associated one of the electrical connectors conveys the overridden one of the signals; and
   communicate data with a controller of the industry standard serial communication interface via the electrical connectors in accordance with the programmed override state for the overridden one of the signals and actual states for the non-overridden signals, wherein the instructions cause the processor to programmably assert and de-assert the overridden one of the signals to override an actual voltage present on the electrical connector associated with the overridden one of the signals.

15. The non-transitory computer readable storage medium of claim 14, wherein the instructions cause the processor to store the configuration data by writing the configuration data to the programmable register based upon the command.

16. The non-transitory computer readable storage medium of claim 14,
   wherein the command further specifies a parameter to selectively assert and de-assert the overridden one of the signals,
   wherein the configuration data further indicates whether the overridden one of the signal is to be treated as asserted or de-asserted based on the command, and
   wherein the instructions cause the processor to further programmably set the override state by:
   receiving command that further specifies the parameter to selectively assert and de-assert the overridden one of the signals; and storing the configuration data that further indicates whether the overridden one of the signals is to be treated as asserted or de-asserted based on the command to the programmable register.

17. The non-transitory computer readable storage medium of claim 14,
wherein the command further specifies a polarity parameter,
wherein the configuration data further defines the override polarity based on the command, and
wherein the instructions cause the processor to further programmably set the override state by:

receiving the command from the client via the interface that further specifies the polarity parameter; and
storing the configuration data that defines the override polarity based on the command to the programmable register.

18. The non-transitory computer readable storage medium of claim 14, further comprising instructions to cause the processor to programmably specify that the actual state associated with the overridden one of the signals is to be disregarded when communicating the data.

* * * * *